United States Patent
Suzuki et al.

(10) Patent No.: US 12,194,411 B2
(45) Date of Patent: Jan. 14, 2025

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Tokyo (JP); TOSHIBA ENERGY SYSTEMS & SOLUTIONS CORPORATION, Kawasaki-shi (JP)

(72) Inventors: Akiko Suzuki, Ota (JP); Yoshihiko Nakano, Yokohama (JP); Reiko Yoshimura, Kawasaki (JP); Asato Kondo, Yokohama (JP); Kenji Sano, Inagi (JP); Toshihiro Imada, Kawasaki (JP); Shinji Murai, Sagamihara (JP); Mitsuru Udatsu, Kawasaki (JP)

(73) Assignees: KABUSHIKI KAISHA TOSHIBA, Tokyo (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 187 days.

(21) Appl. No.: 17/193,381

(22) Filed: Mar. 5, 2021

(65) Prior Publication Data
US 2022/0080348 A1    Mar. 17, 2022

(30) Foreign Application Priority Data
Sep. 15, 2020   (JP) .................. 2020-154852

(51) Int. Cl.
*B01D 53/14*  (2006.01)
*B01D 53/18*  (2006.01)
(Continued)

(52) U.S. Cl.
CPC ..... *B01D 53/1493* (2013.01); *B01D 53/1425* (2013.01); *B01D 53/1475* (2013.01);
(Continued)

(58) Field of Classification Search
CPC ............ B01D 53/1493; B01D 53/1425; B01D 53/1475; B01D 53/18; B01D 53/62;
(Continued)

(56) References Cited

U.S. PATENT DOCUMENTS 10,518,213 B2   12/2019   Fujita et al.
10,625,200 B2    4/2020   Suzuki et al.
(Continued)

FOREIGN PATENT DOCUMENTS

CN    109603455 A  *  4/2019  ............. B01D 53/52
CN    109999648 A     7/2019
(Continued)

OTHER PUBLICATIONS

Rinker et al., "Visosity, Density, and Surface Tension of Binary Mixtures of Water and N-methyldiethanolamine and Water and Diethanolamine and Tertiary Mixtures of These Amines with Water over the Temperature Range 20-100°", J. Chem. Eng. Data 1994, 39, 392-395. (Year: 1994).*

(Continued)

*Primary Examiner* — Anita Nassiri-Motlagh
(74) *Attorney, Agent, or Firm* — Oblon, McClelland, Maier & Neustadt, L.L.P.

(57) ABSTRACT

The embodiments provide an acidic gas absorbent having low diffusibility, an acidic gas removal method employing the acidic gas absorbent, and also an acidic gas removal apparatus employing the absorbent. The acidic gas absorbent according to the embodiment comprises: a particular tertiary amine compound, such as, an alkyl dialkanol amine or a hydroxyalkyl piperazine; a halogen-free ionic surfactant; and an aqueous solvent. The embodiments provide not only the acidic gas absorbent but also an acidic gas removal method and apparatus employing the acidic gas absorbent.

25 Claims, 1 Drawing Sheet

(51) Int. Cl.
*B01D 53/62* (2006.01)
*B01D 53/78* (2006.01)

(52) U.S. Cl.
CPC ............. *B01D 53/18* (2013.01); *B01D 53/62* (2013.01); *B01D 53/78* (2013.01); *B01D 2252/20405* (2013.01); *B01D 2252/20431* (2013.01); *B01D 2252/20489* (2013.01); *B01D 2252/60* (2013.01); *B01D 2257/504* (2013.01)

(58) Field of Classification Search
CPC .......... B01D 53/78; B01D 2252/20405; B01D 2252/20431; B01D 2252/20489; B01D 2252/60; B01D 2257/504
USPC ........................................................ 423/228
See application file for complete search history.

(56) References Cited

U.S. PATENT DOCUMENTS

| | | | |
|---|---|---|---|
| 10,722,838 | B2 | 7/2020 | Kondo et al. |
| 2007/0244205 | A1 | 10/2007 | Koczo et al. |
| 2013/0101493 | A1 | 4/2013 | Okabe et al. |
| 2016/0175769 | A1* | 6/2016 | Kamoun ................ B01D 53/52 252/189 |
| 2019/0083921 | A1 | 3/2019 | Suzuki et al. |
| 2020/0086266 | A1 | 3/2020 | Suzuki et al. |

FOREIGN PATENT DOCUMENTS

| | | | | |
|---|---|---|---|---|
| JP | | 5449059 | B2 | 3/2014 |
| JP | | 2015-054279 | A | 3/2015 |
| JP | | 5701998 | B2 | 4/2015 |
| JP | | 2015071136 | A * | 4/2015 |
| JP | | 2017-164697 | A | 9/2017 |
| JP | | 2018-158302 | A | 10/2018 |
| JP | | 2019-055371 | A | 4/2019 |
| JP | | 2019-055394 | A | 4/2019 |
| JP | | 2020-044492 | A | 3/2020 |
| WO | WO-2019043099 | A1 * | 3/2019 | ......... B01D 53/1425 |

OTHER PUBLICATIONS

CN-109603455-A English translation (Year: 2019).*
JP-2015071136-A English translation (Year: 2015).*
Hauner et al., "The Dynamic Surface Tension of Water", J. Phys. Chem. Lett. 2017, 8, 1599-1603. (Year: 2017).*

* cited by examiner

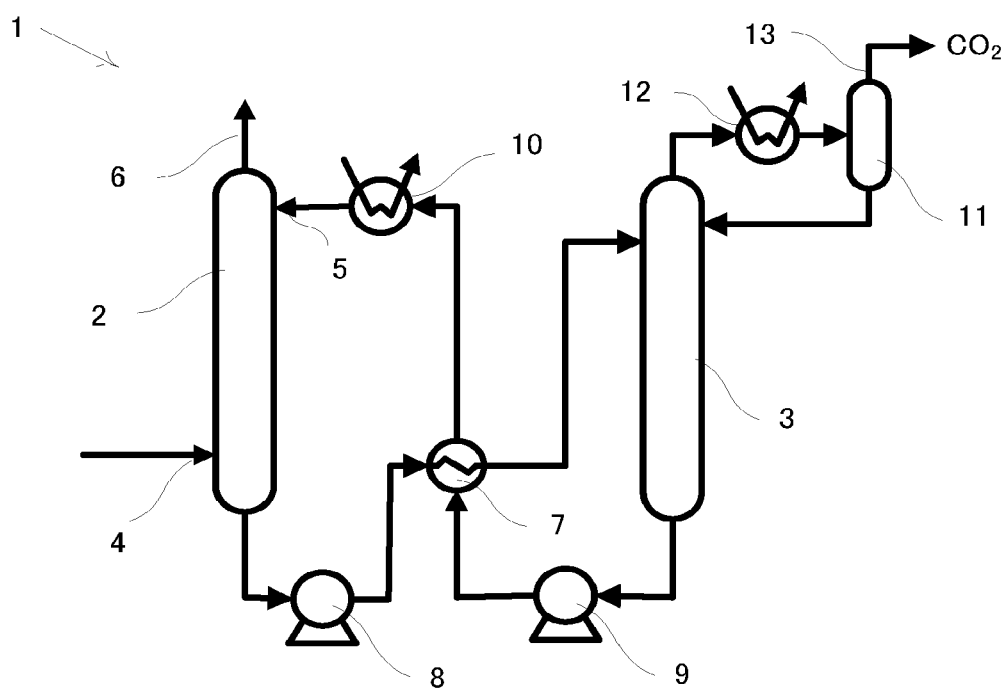

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2020-154852, filed on Sep. 15, 2020, the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere. In particular, it is urgently necessary to reduce $CO_2$ emission from coal-fired power plants and factories. Further, it is also desired to reduce emission of acidic gases other than $CO_2$, such as hydrogen sulfide ($H_2S$).

In view of that, as means for reducing emission of acidic gases such as $CO_2$, much attention is paid to not only improving efficiency of thermal power plants or the like for emission reduction but also $CO_2$ recovery by use of chemical absorbents. As practical chemical absorbents, amine compounds have been studied for a long time. However, it is known that, when adopted for $CO_2$ absorption and desorption process, the absorbents are often heated to regenerate and thereby amine compounds contained therein may be diffused into the atmosphere. If amine compounds are diffused into the atmosphere in great amounts, there is a fear of unfavorable influences on surrounding environments of the processing plant. Accordingly, the plant is generally provided with amine traps made of water or acids so as to prevent diffusion of amine compounds. It is thus necessary to install amine traps, but even so the amine traps are not always able to fully prevent diffusion of the absorbents.

BRIEF DESCRIPTION OF THE DRAWINGS

FIG. 1 schematically shows an acidic gas removal apparatus according to the embodiment.

DETAILED DESCRIPTION

The acidic gas absorbent according to the embodiment comprises:
an amine compound selected from the group consisting of the compounds represented by the following formulas (1) to (3):

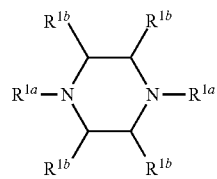

(1)

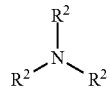

(2)

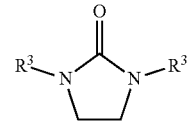

(3)

in which
each $R^{1a}$ is independently hydrogen, a $C_1$-$C_3$ alkyl group, a $C_1$-$C_3$ hydroxyalkyl group a $C_1$-$C_3$ aminoalkyl group or a $C_2$-$C_5$ alkylaminoalkyl group,
each $R^{1b}$ is independently hydrogen or a $C_1$-$C_3$ alkyl group,
each $R^2$ is independently hydrogen, a $C_1$-$C_3$ alkyl group or a $C_1$-$C_3$ hydroxyalkyl group, provided that at least one $R^2$ is a $C_1$-$C_3$ hydroxyalkyl group, and
each $R^3$ is independently hydrogen, a $C_1$-$C_3$ alkyl group, a $C_1$-$C_3$ hydroxyalkyl group, a $C_1$-$C_3$ aminoalkyl group or a $C_2$-$C_5$ alkylaminoalkyl group, provided that at least one $R^3$ is a $C_1$-$C_3$ aminoalkyl group or a $C_2$-$C_5$ alkylaminoalkyl group;
a halogen-free ionic surfactant; and
an aqueous solvent.

Further, the acidic gas removal method according to the embodiment comprises a step in which an acidic gas-containing gas is brought into contact with the above acidic gas absorbent so as to remove the acidic gas from the acidic gas-containing gas.

Furthermore, the acidic gas removal apparatus according to the embodiment comprises:
an absorption unit in which an acidic gas-containing gas is brought into contact with the above acidic gas absorbent, so that the absorbent absorbs the acidic gas to remove it from the acidic gas-containing gas; and
a regeneration unit in which the absorbent holding the acidic gas is made to desorb the acidic gas so as to be regenerated;
so that the absorbent regenerated in the regeneration unit is reused in the absorption unit.

Embodiments will now be explained with reference to the accompanying drawings.

<Acidic Gas Absorbent>

In the following description, the embodiments will be explained mainly in case examples where the acidic gas is carbon dioxide. However, the acidic gas absorbent according to the embodiment can give the same effect on other acidic gases such as hydrogen sulfide. Specifically, the absorbent of the embodiment is suitable to absorb oxidizing gases such as carbon dioxide and hydrogen sulfide. More specifically, the absorbent is particularly suitable for absorbing carbon dioxide and is advantageously employed in a system for recovering carbon dioxide from industrial exhaust fumes.

The acidic gas absorbent according to the embodiment comprises an amine compound as a main agent for absorbing acidic gases. The amine compound used here is selected from the group consisting of the compounds represented by the following formulas (1) to (3):

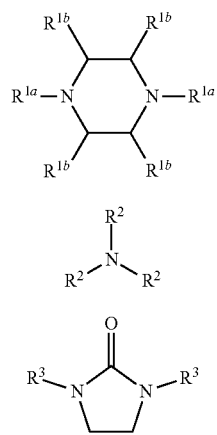

in which
  each $R^{1a}$ is independently hydrogen, a $C_1$-$C_3$ alkyl group, a $C_1$-$C_3$ hydroxyalkyl group a $C_1$-$C_3$ aminoalkyl group or a $C_2$-$C_5$ alkylaminoalkyl group,
  each $R^{1b}$ is independently hydrogen or a $C_1$-$C_3$ alkyl group,
  each $R^2$ is independently hydrogen, a $C_1$-$C_3$ alkyl group or a $C_1$-$C_3$ hydroxyalkyl group, provided that at least one $R^2$ is a $C_1$-$C_3$ hydroxyalkyl group, and
  each $R^3$ is independently hydrogen, a $C_1$-$C_3$ alkyl group, a $C_1$-$C_3$ hydroxyalkyl group, a $C_1$-$C_3$ aminoalkyl group or a $C_2$-$C_5$ alkylaminoalkyl group, provided that at least one $R^3$ is a $C_1$-$C_3$ aminoalkyl group or a $C_2$-$C_5$ alkylaminoalkyl group. Those amine compounds may be used singly or in combination of two or more.

The amine compounds represented by the formula (1) are hydroxyalkyl-substituted piperazine derivatives, such as, hydroxyalkyl piperazine and dihydroxyalkyl piperazine. The $C_1$-$C_3$ alkyl group involves isopropyl group. Specifically, the following are concrete examples of the amine compounds represented by the formula (1):

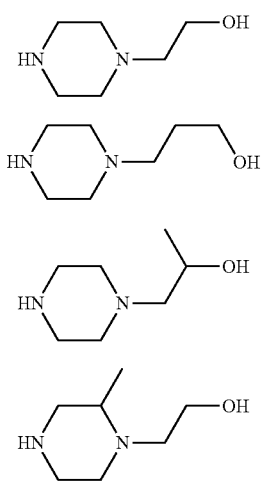

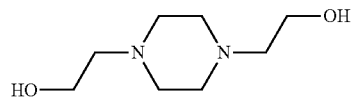

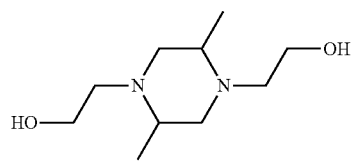

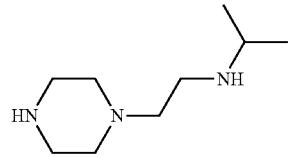

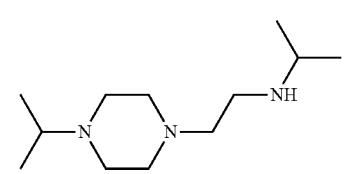

The amine compounds represented by the formula (2) are alkanol amine derivatives, such as, alkyl dialkanol amine, dialkyl dialkanol amine and trialkanol amine. Specifically, the following are concrete examples of the amine compounds represented by the formula (2):

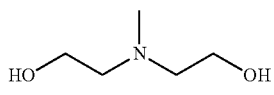

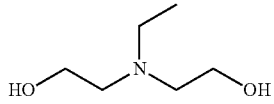

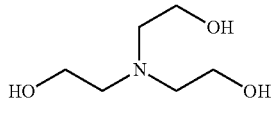

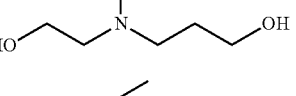

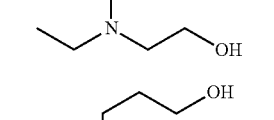

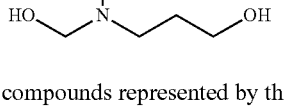

The amine compounds represented by the formula (3) are hydroxyalkyl-substituted imidazolidione derivatives, such as, N-aminoalkyl imidazolidione and di-N-aminoalkyl imidazolidione. Specifically, the following are concrete examples of the amine compounds represented by the formula (3):

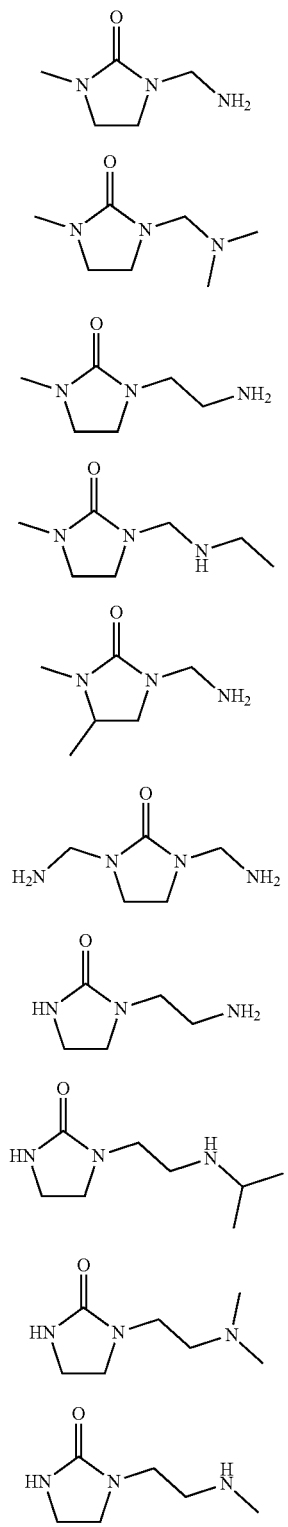

(3-1)
(3-2)
(3-3)
(3-4)
(3-5)
(3-6)
(3-7)
(3-8)
(3-9)
(3-10)

In addition to the above compounds represented by the formulas (1) to (3), the acidic gas absorbent according to the embodiment may comprise additional amine compounds. The additional amine compounds can be freely selected from amine compounds conventionally used in known acidic gas absorbents.

Specifically, examples of the additional amine compounds include primary amines, secondary amines, tertiary amines and quaternary ammoniums. Further, polyamine compounds such as diamines and triamines are also employable. Furthermore, it is still also possible to adopt derivatives in which hydrogens in the above amine compounds are replaced with substituents such as hydroxy or in which methylene groups in the amine compounds are replaced with oxy, carbonyl, sulfonyl or the like. Although amine compounds are water-soluble in general, ones having high water-solubility are preferably adopted as the additional amine compounds.

More specifically, compounds usable as the additional amine compounds are as follows:
(i) aminoalcohols,
(ii) cyclic amines,
(iii) primary amines,
(iv) secondary amines,
(v) tertiary amines,
(vi) polyamines,
(vii) polyalkylenepolyamines, and
(viii) amino acids.

Here, it should be noted that the above categories are only for the sake of convenience, and there are some amine compounds included in two or more of the above categories. For example, methyldiethanolamine is a kind of aminoalcohol and is also a kind of tertiary amine. Further, for example, although the amine compounds of the formulas (1) to (3) can be categorized into the tertiary amines, they are expediently not regarded as the additional amine compounds.

Among the above, it is preferred to adopt aminoalcohols and amino acids, which contain hydroxy groups, and polyamines because they can improve diffusibility.

As the amine compounds represented by the formulas (1) to (3) and the additional amine compounds, amine compounds having low vapor pressures are employed in the embodiment. Since those amine compounds have low vapor pressures, it can be realized to keep the diffusibility thereof at a low level.

Specifically, the amine compound has a vapor pressure of 0.001 to 10 Pa, preferably 0.005 to 5 Pa, more preferably 0.01 to 1 Pa at 20° C. If an amine compound having a high vapor pressure is used, the effect of the embodiment may be weakened. Preferred examples of the amine compound satisfying the above vapor pressure condition include: 2-hydroxyethylpiperazine (an amine compound of the formula (1), vapor pressure at 20° C.: 0.03 Pa), methyldiethanolamine (an amine compound of the formula (2), vapor pressure at 20° C.: 0.03 Pa), ethyldiethanol-amine (an amine compound of the formula (2), vapor pressure at 20° C.: 0.3 Pa), and diethanolamine (an additive amine compound, vapor pressure at 20° C.: 0.04 Pa).

The acidic gas absorbent is repeatedly used, and hence the compound preferably has high stability. In view of that, it is preferred not to adopt ammonia, methylamine or hydrazine.

The acidic gas absorbent according to the embodiment also comprises a halogen-free ionic surfactant. When combined with a particular surfactant, the above amine compound can be remarkably improved in diffusibility while keeping the surface tension.

Surfactants are generally categorized into ionic surfactants and nonionic ones according to the structures of surface active moieties thereof. The ionic surfactants are further categorized into anionic ones, cationic ones and amphoteric ones, which have both anionic and cationic moieties in their molecules. In the embodiment, ionic surfactants are employed. Preferably the halogen-free ionic surfactant has an ionic group selected from the group consisting of carboxy group, sulfo group, phosphate group, amino group and ammonium group.

Examples of the anionic surfactants include alkyl-benzenesulfonic acids and monoalkylphosphoric acids. Examples of the cationic surfactants include alkyltrimethyl-ammonium salts. Examples of the amphoteric surfactants include: alkylbetaine-type surfactants, such as, alkyldimethyl-amineoxide; sulfobetaine-type surfactants, such as, lauryl hydroxy sulfobetaine; and betaine-type surfactants, such as, lauryl betaine. On the other hand, in view of keeping the diffusibility at a low level, nonionic surfactants are preferably not adopted in the embodiment.

The surfactant employed in the embodiment is selected according to the kind and amount of the adopted amine compound. Specifically, it is preferred to employ surfactants of sulfonic acid salts, ones of phosphoric acid salts or ones having betaine structures in their molecules.

Further, the surfactant usable in the embodiment does not contain halogen. There are some surfactants containing halogen such as fluorine, but those halogen-containing surfactants have little effect of improving the diffusibility. Moreover, from the ecological viewpoint, it is preferred not to use them.

The acidic gas absorbent according to the embodiment comprises an aqueous solution as a solvent in which the aforementioned amine compound and surfactant are dissolved or dispersed. The aqueous solution mainly comprises water and, if necessary, may comprise a small amount of organic solvent. However, if the organic solvent has a low boiling point, there is a fear that it may evaporate in the acidic gas removal apparatus to damage the apparatus. The organic solvent, therefore, has a boiling point higher than water, namely, a boiling point of 100° C. or more.

The acidic gas absorbent comprises the amine compound in an amount of preferably 3 to 80 wt %, more preferably 5 to 75 wt % based on the total mass of the absorbent. On the assumption that the total amount of the amine compounds is regarded as 100 wt %, the amount of the compounds represented by the formulas (1) to (3) is preferably 10 to 100 wt % inclusive, more preferably 30 to 100 wt % inclusive. All the amine compounds contained in the absorbent may be those of the formulas (1) to (3).

It is generally preferred for the amine concentration to be high in view of energy consumption, plant scale and processing efficiency. That is because carbon dioxide is absorbed and desorbed in large amounts per unit volume and further the rates thereof are high when the amine compound is contained in a high concentration.

When adopted for recovering carbon dioxide, the acidic gas absorbent comprising the amine compound in an amount within the above range has an appropriate viscosity and is not only capable of absorbing carbon dioxide in a large amount at a high rate but also capable of desorbing carbon dioxide in a large amount at a high rate. Accordingly, the absorbent has the advantage of efficiently recovering carbon dioxide.

The acidic gas absorbent comprises the surfactant in an amount of preferably 0.1 to 40 ppm, more preferably 0.1 to 30 ppm, further preferably 2 to 20 ppm based on the total mass of the absorbent. The more the absorbent comprises the surfactant, the more the diffusibility is improved. However, if the surfactant is contained too much, the absorbent may have such high foamability as to be difficult to handle.

There are no particular restrictions on the viscosity of the acidic gas absorbent, but it is preferably 0.01 to 200 mPa·s, more preferably 0.01 to 100 mPa·s at 25° C. If the viscosity is too high, the absorbent has poor handling properties.

The viscosity of the absorbent can be measured by means of VISCOMETER DV-II+Pro™, manufactured by BROOKFIELD).

The carbon dioxide absorbent preferably has a surface tension of 40 mN/m or more at 25° C. If the surface tension is reduced, the absorbent tends to foam and may cause an unexpected shutdown of the plant. As a result of research on the relation between diffusibility and other various properties of the absorbent, it was found that there is a low correlation between the surface tension and the amine diffusibility. Specifically, the absorbent to which the surfactant is added in an amount within the above range of the embodiment has a surface tension changed only within a range of ±3 mN/m based on that of the original absorbent. In the embodiment, the surface tension is defined as a value measured according to pendant-drop method at 25° C. by means of Drop Master 300™, manufactured by Kyowa Interface Science Co., Ltd.).

The acidic gas absorbent according to the embodiment comprises the above amine compound and the above surfactant, and it can further comprise other optional ingredients according to necessity.

Examples of the optional ingredients include: oxidation inhibitors, pH adjusters, defoaming agents, and anticorrosive agents.

Preferred examples of the oxidation inhibitors include: dibutylhydroxytoluene (BHT), butylhydroxyanisole (BHA), sodium erythorbate, sodium nitrite, sulfur dioxide, 2-mercaptoimidazole and 2-mercaptobenzimidazole. When the oxidation inhibitor is incorporated, the amount thereof is preferably 0.01 to 1 wt %, more preferably 0.1 to 0.5 wt % (provided that the whole amount of the absorbent is regarded as 100 wt %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 wt %, more preferably 0.0005 to 0.001 wt % (provided that the whole amount of the absorbent is regarded as 100 wt %). The defoaming agent can inhibit foaming of the absorbent so as to prevent decrease of absorption and desorption efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 wt %, more preferably 0.00005 to 0.005 wt % (provided that the whole amount of the absorbent is regarded as 100 wt %). The anticorrosive agent prevents corrosion of the plant facilities to extend the working lifetime thereof.

The acidic gas absorbent of the embodiment preferably does not contain an organic compound having a boiling point of 100° C. or less. Such organic compound may evaporate in the acidic gas absorption process to damage the apparatus and/or to cause environmental pollution. Therefore, even if an organic compound such as an organic solvent is incorporated for the purpose of improving the solubility or the like, the amount thereof is preferably 1 wt % or less based on the total mass of the absorbent.

Further, the absorbent according to the embodiment preferably does not contain metal. That is because the metal may cause damage such as corrosion to the apparatus with which the absorbent comes in contact. The absorbent, therefore, preferably contains no metal. However, when practically used, the absorbent comes in contact with the apparatus and metal may elute from the apparatus. Accordingly, the absorbent is allowed to contain an extremely small amount of metal. Even in that case, however, the amount of metal is preferably 1 wt % or less based on the total mass of the absorbent.

As described above, the acidic gas absorbent of the present embodiment can reduce the amount of acidic gas, such as carbon dioxide, diffusing out of the reaction apparatus. In addition, only a small amount of energy is necessary for recovering the acidic gas. Further, the absorbent has not only high reactivity with acidic gases (such as, carbon dioxide ($CO_2$), hydrogen sulfide ($H_2S$) and carbonyl sulfide (COS)) but also excellent solubility in water, and hence is hardly deposited when absorbing those acidic gases.

The acidic gas absorbent comprising the compound according to the embodiment is remarkably improved in absorption capacity of acidic gases (particularly, carbon dioxide) per unit mol and in absorption capacity and rate of acidic gases per unit volume of the absorbent. Further, the absorbent of the embodiment also can reduce the amounts of amines emitted from the absorption tower and the regeneration tower.

<Acidic Gas Removal Method>

In the acidic gas removal method according to the embodiment, an acidic gas-containing gas is brought into contact with the acidic gas absorbent so as to remove the acidic gas from the acidic gas-containing gas.

The acidic gas removal method of the embodiment basically comprises: a step (absorption step) in which the aforementioned absorbent of the embodiment is made to absorb an acidic gas; and another step in which the acidic gas-holding absorbent of the embodiment is made to release the absorbed acidic gas.

Specifically, the acidic gas removal method according the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to desorb and remove the acidic gas from the absorbent.

There are no particular restrictions on how an acidic gas-containing gas is brought into contact with an aqueous solution containing the above acidic gas absorbent. For example, the acidic gas-containing gas may be bubbled and thereby absorbed in the absorbent; the absorbent may be sprayed in the form of mist into a stream of the acidic gas-containing gas (spray method); or otherwise, the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated while the liquid interface thereof is spread in a plate column, in a spray tower or in a regeneration tower filled with a ceramic or metal mesh filler.

When the acidic gas is desorbed, the acidic gas absorbent is kept at a temperature of normally 70° C. or more, preferably 80° C. or more, further preferably 90 to 120° C. The higher the temperature is, the more the acidic gas is desorbed. However, in order to raise the temperature, it is necessary to increase energy for heating the absorbent. Accordingly, the temperature can be determined according to the gas temperature in the process and to the heat recovery target or the like. The pressure in the step of desorbing the acidic gas can be normally set at about 1 to 3 atm.

After the acidic gas is desorbed, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has such a high purity as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

Among the above steps, the most energy is consumed in the step where the acidic gas is desorbed from the acidic gas absorbent to regenerate the absorbent. Specifically, this step often consumes about 50 to 80% of the energy used in all the steps. Accordingly, if it is realized to reduce energy consumption in the step of regenerating the absorbent, it becomes possible to lower the cost for absorbing and desorbing the acidic gas and, as a result, the acidic gas can be removed from exhaust fumes efficiently and economically advantageously.

The acidic gas removal method according to the embodiment can reduce energy necessary for desorbing the acidic gas (namely, for the regeneration step), and therefore the carbon dioxide absorption and desorption steps can be carried out efficiently and economically advantageously.

<Acidic Gas Removal Apparatus>

The acidic gas removal apparatus according to the embodiment comprises:
  an absorption unit in which an acidic gas-containing gas is brought into contact with the first or second acidic gas absorbent, so that the absorbent absorbs the acidic gas to remove it from the acidic gas-containing gas; and
  a regeneration unit in which the absorbent holding the acidic gas is made to desorb the acidic gas so as to be regenerated;
  so that the absorbent regenerated in the regeneration unit is reused in the absorption unit.

FIG. 1 schematically shows the acidic gas removal apparatus according to the embodiment.

The acidic gas removal apparatus 1 comprises: an absorption unit 2 in which an acidic gas-containing gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to desorb the acidic gas so as to be regenerated. In the following description, the explanation is given in case examples where the acidic gas is carbon dioxide.

As shown in FIG. 1, a discharge gas containing carbon dioxide, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

The acidic gas absorbent may comprise not only the aforementioned amine compound and the solvent such as water, but also other compounds, such as, nitrogen-containing compounds that improve carbon dioxide absorption performance, antioxidants and pH adjusters, in desirable amounts.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 to the outside from the absorption unit 2.

The carbon dioxide-holding absorbent is then sent by a rich liquid pump 8 to a heat exchanger 7 and then to the regeneration unit 3. In the regeneration unit 3, while the absorbent is moved down from the upper part to the lower part, the acidic gas is desorbed from the absorbent and thereby the absorbent is regenerated.

The absorbent regenerated in the regeneration unit 3 is sent by a lean liquid pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The carbon dioxide-containing reflux water is cooled with a reflux condenser 12, and thereafter separated in the reflux drum 11 into water and a liquid component condensed from water vapor accompanying carbon dioxide. The liquid component is sent through an acidic gas recovering line 13 for the step of recovering the acidic gas. Meanwhile, the reflux water separated from the acidic gas is sent into the regeneration unit 3.

The acidic gas removal apparatus 1 thus employs the acidic gas absorbent excellent in acidic gas absorption and desorption performance, and thereby makes it possible to absorb and remove acidic gases efficiently.

EXAMPLES

Example 1

In water, methyldiethanolamine (represented by the formula (2-1)) and sodium lauryl sulfate were dissolved so that the concentrations thereof might be 45 wt % and 20 ppm, respectively, to prepare an absorbent. This absorbent was found to have a surface tension of 50 mN/m.

The absorbent was bubbled with 1% $CO_2/N_2$ at a rate of 0.5 L/min at 40° C. for 2 hours, and the diffused amine compound was collected to evaluate the diffusibility. As a result, the diffusibility was found to be about 0.9 ppm (v/v).

Example 2

The procedure of Example 1 was repeated except that the surfactant was changed into a carboxybetaine-type surfactant (AMOGEN S-H™, manufactured by DKS Co. Ltd.) so that the concentration thereof might be 2 ppm, to prepare an absorbent, which was then evaluated in the same manner as in Example 1. As a result, the surface tension and the diffusibility were found to be 49 mN/m and about 1.1 ppm (v/v), respectively.

Example 3

The procedure of Example 1 was repeated except that the surfactant was changed into an anionic-type surfactant (BEAULIGHT NA-25S™, manufactured by SANYO CHEMICAL, LTD.) so that the concentration thereof might be 2 ppm, to prepare an absorbent, which was then evaluated in the same manner as in Example 1. As a result, the surface tension and the diffusibility were found to be 49 mN/m and about 1.1 ppm (v/v), respectively.

Example 4

The procedure of Example 1 was repeated except that the surfactant was changed into an anionic-type surfactant (BEAULIGHT NA-25S™, manufactured by SANYO CHEMICAL, LTD.) so that the concentration thereof might be 10 ppm, to prepare an absorbent, which was then evaluated in the same manner as in Example 1. As a result, the surface tension and the diffusibility were found to be 48 mN/m and about 0.9 ppm (v/v), respectively.

Example 5

The procedure of Example 1 was repeated except that the surfactant was changed into an anionic-type surfactant (BEAULIGHT NA-25S™, manufactured by SANYO CHEMICAL, LTD.) so that the concentration thereof might be 20 ppm, to prepare an absorbent, which was then evaluated in the same manner as in Example 1. As a result, the surface tension and the diffusibility were found to be 48 mN/m and about 1.2 ppm (v/v), respectively.

Example 6

The procedure of Example 1 was repeated except that the amine compound was changed into N-(2-hydroxyethyl)-piperazine (represented by the formula (1-1)) so that the concentration thereof might be 50 wt %, to prepare an absorbent, which was then evaluated in the same manner as in Example 1. As a result, the surface tension and the diffusibility were found to be 59 mN/m and about 0.3 ppm (v/v), respectively.

Example 7

The procedure of Example 3 was repeated except that the amine compound was changed into 1-(2-aminoethyl)-2-imidazolidinone so that the concentrations thereof might be 50 wt %, to prepare an absorbent, which was then evaluated in the same manner as in Example 3. As a result, the surface tension and the diffusibility were found to be 55 mN/m and about 0.5 ppm (v/v), respectively.

Comparative Example 1

In water, methyldiethanolamine (vapor pressure: 0.03 Pa at 25° C.) was dissolved so that the concentration thereof might be 45 wt %, to prepare an absorbent. This absorbent was found to have a surface tension of 51 mN/m. The absorbent was then evaluated on the diffusibility in the same manner as in Example 1. As a result, the diffusibility was found to be about 2.2 ppm (v/v).

Comparative Example 2

In water, N-(2-hydroxyethyl)piperazine was dissolved so that the concentration thereof might be 50 wt %, to prepare an absorbent. This absorbent was found to have a surface tension of 57 mN/m. The absorbent was then evaluated on the diffusibility in the same manner as in Example 1. As a result, the diffusibility was found to be about 0.8 ppm (v/v).

Comparative Example 3

The procedure of Example 1 was repeated except that the surfactant was changed into a perfluoroalkyl-type cationic surfactant (Surflon S-221™, manufactured by AGC SEIMI CHEMICAL CO., LTD.) so that the concentration thereof might be 2 ppm, to prepare an absorbent, which was then evaluated in the same manner as in Example 1. As a result, the surface tension and the diffusibility were found to be 50 mN/m and about 2.7 ppm (v/v), respectively.

Comparative Example 4

The procedure of Example 1 was repeated except that the surfactant was changed into a perfluoroalkyl-type amphoteric surfactant (Surflon S-231™, manufactured by AGC SEIMI CHEMICAL CO., LTD.) so that the concentration thereof might be 2 ppm, to prepare an absorbent, which was then evaluated in the same manner as in Example 1. As a result, the surface tension and the diffusibility were found to be 50 mN/m and about 2.7 ppm (v/v), respectively.

Comparative Example 5

The procedure of Example 1 was repeated except that the surfactant was changed into a perfluoroalkyl-type nonionic surfactant (Surflon S-242™, manufactured by AGC SEIMI CHEMICAL CO., LTD.) so that the concentration thereof might be 2 ppm, to prepare an absorbent, which was then evaluated in the same manner as in Example 1. As a result, the surface tension and the diffusibility were found to be 49 mN/m and about 6.1 ppm (v/v), respectively.

Comparative Example 6

The procedure of Example 1 was repeated except that the surfactant was changed into a perfluoroalkyl-type nonionic polymer surfactant (Surflon S-656™, manufactured by AGC SEIMI CHEMICAL CO., LTD.) so that the concentration thereof might be 2 ppm, to prepare an absorbent, which was then evaluated in the same manner as in Example 1. As a result, the surface tension and the diffusibility were found to be 49 mN/m and about 6.1 ppm (v/v), respectively.

Comparative Example 7

The procedure of Example 1 was repeated except that the surfactant was changed into a nonionic surfactant (NOIGEN LF60X™, manufactured by DKS Co. Ltd.) so that the concentration thereof might be 2 ppm, to prepare an absorbent, which was then evaluated in the same manner as in Example 1. As a result, the surface tension and the diffusibility were found to be 49 mN/m and about 5.5 ppm (v/v), respectively.

Comparative Example 8

The procedure of Example 1 was repeated except that the surfactant was changed into a nonionic surfactant (NOIGEN ET-65™, manufactured by DKS Co. Ltd.) so that the concentration thereof might be 2 ppm, to prepare an absorbent, which was then evaluated in the same manner as in Example 1. As a result, the surface tension and the diffusibility were found to be 49 mN/m and about 9.4 ppm (v/v), respectively.

Comparative Example 9

In water, diethylenetriamine was dissolved so that the concentration thereof might be 50 wt %, to prepare an absorbent. This absorbent was found to have a surface tension of 59 mN/m. The absorbent was then evaluated on the diffusibility in the same manner as in Example 1. As a result, the diffusibility were found to be about 3.6 ppm (v/v).

Comparative Example 10

The procedure of Comparative example 9 was repeated except that a carboxybetaine-type surfactant (AMOGEN S-H™, manufactured by DKS Co. Ltd.) was dissolved so that the concentration thereof might be 2 ppm, to prepare an absorbent, which was then evaluated in the same manner as in Comparative example 9. As a result, the surface tension and the diffusibility were found to be 62 mN/m and about 3.8 ppm (v/v), respectively.

Comparative Example 11

In water, piperazine was dissolved so that the concentration thereof might be 10 wt % to prepare an absorbent. This absorbent was found to have a surface tension of 69 mN/m.

The absorbent was bubbled with 1% $CO_2/N_2$ at a rate of 1 L/min at 40° C. for 2 hours, and the diffused amine compound was collected to evaluate the diffusibility. As a result, the diffusibility was found to be about 5.7 ppm (v/v).

Comparative Example 12

The procedure of Comparative example 11 was repeated except that sodium lauryl sulfate was dissolved so that the concentration thereof might be 6 ppm, to prepare an absorbent. This absorbent was found to have a surface tension of 66 mN/m.

The absorbent was bubbled with 1% $CO_2/N_2$ at a rate of 1 L/min at 40° C. for 2 hours, and the diffused amine compound was collected to evaluate the diffusibility. As a result, the diffusibility was found to be about 6.3 ppm (v/v).

Comparative Example 13

As the amine compound, 1-(2-aminoethyl)-2-imidazolidinone was dissolved so that the concentration thereof might be 50 wt %, to prepare an absorbent, which was then evaluated in the same manner as in Example 1. As a result, the surface tension and the diffusibility were found to be 57 mN/m and about 0.9 ppm (v/v), respectively.

The obtained results are set forth as follows.

TABLE 1

|  | amine compound | | surfactant | | | | evaluation surface | |
|---|---|---|---|---|---|---|---|---|
|  | substance | conc. (wt %) | substance | halogen | ionicity | conc. (ppm) | tension (mN/m) | diffusibiliy (ppm) |
| Ex. 1 | methyldiethanolamine (formula 2-1) | 45 | sodium lauryl sulfate | not contain | anionic | 20 | 50 | 0.9 |
| Ex. 2 | methyldiethanolamine (formula 2-1) | 45 | AMOGEN S-H | not contain | amphoteric | 2 | 49 | 1.1 |
| Ex. 3 | methyldiethanolamine (formula 2-1) | 45 | BEAULIGHT NA-25S | not contain | anionic | 2 | 49 | 1.1 |
| Ex. 4 | methyldiethanolamine (formula 2-1) | 45 | BEAULIGHT NA-25S | not contain | anionic | 10 | 48 | 0.9 |
| Ex. 5 | methyldiethanolamine (formula 2-1) | 45 | BEAULIGHT NA-25S | not contain | anionic | 20 | 48 | 1.2 |
| Ex. 6 | N-(2-hydroxyethyl)piperazine (formula 1-1) | 50 | sodium lauryl sulfate | not contain | anionic | 20 | 59 | 0.3 |
| Ex. 7 | 1-(2-aminoethyl)-2-imidazolidinone (formula 3-7) | 50 | BEAULIGHT NA-25S | not contain | anionic | 2 | 55 | 0.5 |
| Com. 1 | methyldiethanolamine (formula 2-1) | 45 | — | — | — | — | 51 | 2.2 |
| Com. 2 | N-(2-hydroxyethyl)piperazine (formula 1-1) | 50 | — | — | — | — | 57 | 0.8 |
| Com. 3 | methyldiethanolamine (formula 2-1) | 45 | SurfIon S-221 | contain | cationic | 2 | 50 | 2.7 |
| Com. 4 | methyldiethanolamine (formula 2-1) | 45 | SurfIon S-231 | contain | amphoteric | 2 | 50 | 2.7 |
| Com. 5 | methyldiethanolamine (formula 2-1) | 45 | SurfIon S-242 | contain | nonionic | 2 | 49 | 6.1 |
| Com. 6 | methyldiethanolamine (formula 2-1) | 45 | SurfIon S-656X | contain | nonionic | 2 | 49 | 6.1 |
| Corn. 7 | methyldiethanolamine (formula 2-1) | 45 | NOIGEN LF60X | not contain | nonionic | 2 | 49 | 5.5 |
| Corn. 8 | methyldiethanolamine (formula 2-1) | 45 | NOIGEN ET-65 | not contain | nonionic | 2 | 49 | 9.4 |
| Corn. 9 | diethylenetriamine | 50 | — | — | — | — | 59 | 3.6 |
| Com. 10 | diethylenetnamine | 50 | AMOGEN S-H | not contain | amphoteric | 2 | 62 | 3.8 |
| Com. 11 | piperazine | 10 | — | — | — | — | 69 | 5.7 |
| Com. 12 | piperazine | 10 | sodium lauryl sulfate | not contain | anionic | 6 | 66 | 6.3 |
| Com. 13 | 1-(2-aminoethyl)-2-imidazolidinone (formula 3-7) | 50 | — | — | — | — | 57 | 0.9 |

The results of the above examples indicate that the diffusibility can be improved by combinations of particular amine compounds and particular surfactants.

In comparison among the absorbents comprising the same amine compound, those containing halogen-free nonionic surfactants reduced the diffusibility more than the others.

It can be thus realized to reduce the diffusibility by use of at least one of the embodiments, namely, the aforementioned acidic gas absorbent, the aforementioned acidic gas removal method and the aforementioned acidic gas removal apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas absorbent suitable for absorbing carbon dioxide, comprising:
   an aqueous solvent;
   a halogen-free ionic surfactant; and
   an amine compound comprising
   a first amine compound selected from the group consisting of (1-1) to (1-8):

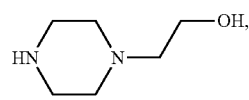
(1-1)

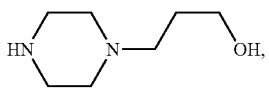
(1-2)

-continued

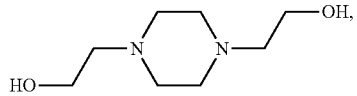
(1-3)

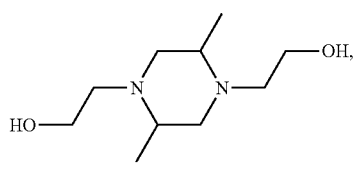
(1-4)

(1-5)

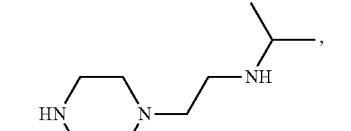
(1-6)

(1-7)

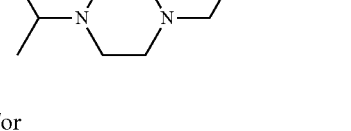
(1-8)

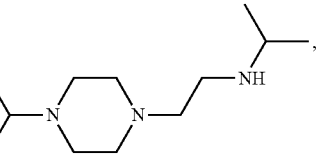

and/or
a second amine compound selected from the group consisting of (2-1) to (2-6):

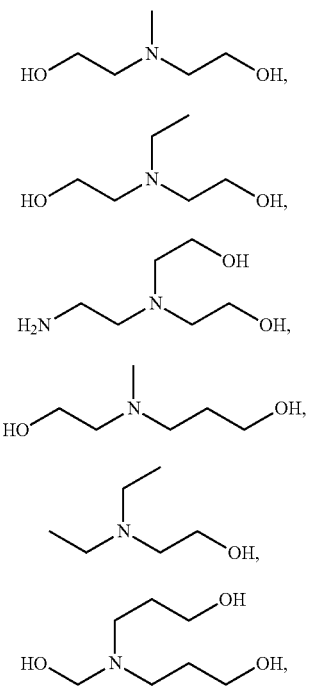

(2-1)
(2-2)
(2-3)
(2-4)
(2-5)
(2-6)

wherein the halogen-free ionic surfactant is present in a range of from 0.1 to 40 ppm, based on total acidic gas absorbent weight,
wherein the halogen-free ionic surfactant has an ionic group selected from the group consisting of carboxy group, sulfo group, phosphate group, amino group, and ammonium group,
wherein the amine compound is present in a range of from 5 to 75 wt. %, based on the total acidic gas absorbent weight, and
wherein a sum of the first and the second amine compound is in a range of from 10 to 100 wt. % of total amine compound.

2. The acidic gas absorbent of claim 1, which has a surface tension of 40 mN/m or more at 25° C. before carbon dioxide is introduced thereinto.

3. The acidic gas absorbent of claim 1, which has a viscosity of 1 to 200 mPa·s at 25° C.

4. An acidic gas removal method, comprising:
contacting an acidic gas-containing gas with the acidic gas absorbent of claim 1 so as to remove acidic gas from the acidic gas-containing gas.

5. The acidic gas absorbent of claim 1, wherein the amine compound has any one of formula (1-1) to (1-8).

6. The acidic gas absorbent of claim 1, wherein the amine compound has any one of formula (2-1) to (2-6).

7. The acidic gas absorbent of claim 1, wherein the halogen-free ionic surfactant is present in a range of from 0.1 to 30 ppm, based on the total acidic gas absorbent.

8. The acidic gas absorbent of claim 1, wherein the halogen-free ionic surfactant is present in a range of from 2 to 20 ppm, based on the total acidic gas absorbent.

9. The method of claim 4, wherein the acidic gas is $CO_2$.

10. The acidic gas absorbent of claim 1, wherein the sum of the first and the second amine compound is in a range of from 30 to 75 wt. % of the amine compound.

11. The acidic gas absorbent of claim 1, wherein the amine compound consists of the first and the second amine compound.

12. The acidic gas absorbent of claim 1, which has a surface tension in a range of from 40 to 66 mN/m at 25° C. before carbon dioxide is introduced thereinto.

13. An adsorbent system solution, comprising:
the acidic gas absorbent of claim 1; and
industrial exhaust fumes of $CO_2$ gas.

14. The acidic gas absorbent of claim 1, wherein the amine compound is present in a range of from 45 to 75 wt. %, based on the total acidic gas absorbent weight.

15. The acidic gas absorbent of claim 1, wherein the acidic gas absorbent does not comprise a metal or comprise solely sodium as metal.

16. The acidic gas absorbent of claim 1, wherein the acidic gas absorbent does not comprise a nonionic surfactant.

17. An acidic gas absorbent suitable for absorbing carbon dioxide, the absorbent consisting of:
at least one aqueous solvent having no more than 1 wt. % of organic compound(s);
at least one halogen-free ionic surfactant; and
optionally, an oxidation inhibitor in a range of from 0.01 to 1 wt. %, which is at least one selected from the group consisting of dibutylhydroxytoluene, butylhydroxyanisole, sodium erythorbate, sodium nitrite, sulfur dioxide, 2-mercaptoimidazole and 2-mercaptobenzimidazole;
optionally, a defoaming agent in a range of from 0.00001 to 0.001 wt. %, which is at least one selected from the group consisting of silicone defoaming agent and an organic defoaming agent;
optionally, an anticorrosive agent in a range of from 0.00003 to 0.0008 wt. %, which is at least one selected from the group consisting of a phosphate ester, a tolyltriazole, and a benzotriazole; and
at least one amine compound selected from the group consisting of a first amine compound of formula (1), and a second amine compound of formula (2):

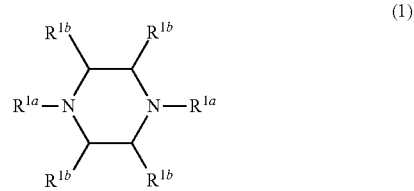

(1)
(2)

wherein
each $R^{1a}$ is independently H, a $C_1$ to $C_3$ alkyl group, a $C_1$ to $C_3$ hydroxyalkyl group a $C_1$ to $C_3$ aminoalkyl group, or a $C_2$ to $C_5$ alkylaminoalkyl group,
each $R^{1b}$ is independently H or a $C_1$ to $C_3$ alkyl group, and
each $R^2$ is independently H, a $C_1$ to $C_3$ alkyl group, or a $C_1$ to $C_3$ hydroxyalkyl group, provided that at least one $R^2$ is a $C_1$ to $C_3$ hydroxyalkyl group,
wherein the acidic gas absorbent does not comprise a metal or comprise solely sodium as metal,
wherein the halogen-free ionic surfactant is present in a range of from 0.1 to 40 ppm, based on total acidic gas absorbent weight, and
wherein the at least one amine compound is present in at least 45 wt. %, based on the total acidic gas absorbent weight.

18. The acidic gas absorbent of claim 17, wherein the amine compound is present in a range of from 50 to 75 wt. %, based on the total acidic gas absorbent, wherein the halogen-free ionic surfactant is present in a range of from 0.1 to 30 ppm, based on the total acidic gas absorbent, wherein the solvent consists of water, and wherein the at least one amine compound is at least one selected from the group consisting of:

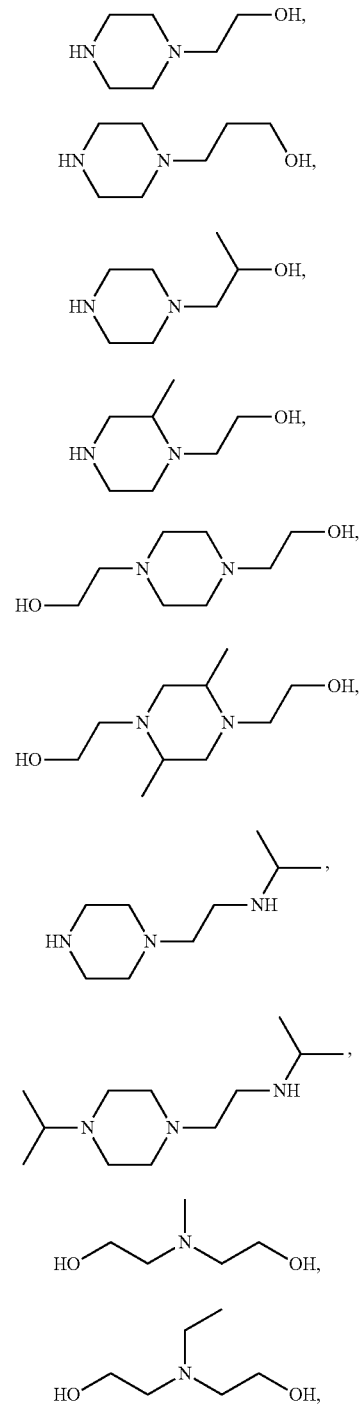

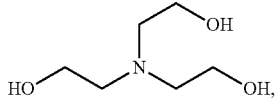

(2-3)

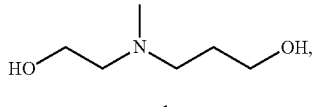

(2-4)

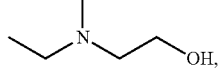

(2-5)

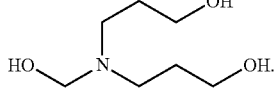

(2-6)

19. An adsorbent system solution, comprising:
the acidic gas absorbent of claim 18; and
industrial exhaust fumes of $CO_2$ gas dissolved in the aqueous solvent.

20. An acidic gas absorbent suitable for absorbing carbon dioxide, comprising:
an aqueous solvent;
a halogen-free ionic surfactant; and
an amine compound comprising a first amine compound of formula (1) and/or a second amine compound of formula (2):

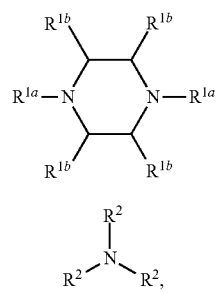

wherein
each $R^{1a}$ is independently H, a $C_1$ to $C_3$ alkyl group, a $C_1$ to $C_3$ hydroxyalkyl group a $C_1$ to $C_3$ aminoalkyl group, or a $C_2$ to $C_5$ alkylaminoalkyl group,
each $R^{1b}$ is independently H or a $C_1$ to $C_3$ alkyl group, and
each $R^2$ is independently H, a $C_1$ to $C_3$ alkyl group, or a $C_1$ to $C_3$ hydroxyalkyl group, provided that at least one $R^2$ is a $C_1$ to $C_3$ hydroxyalkyl group,
wherein the halogen-free ionic surfactant is present in a range of from 0.1 to 40 ppm, based on total acidic gas absorbent weight,
wherein the halogen-free ionic surfactant has an ionic group selected from the group consisting of carboxy group, sulfo group, phosphate group, amino group, and ammonium group,
wherein the amine compound is present in a range of from 3 to 80 wt. %, based on the total acidic gas absorbent weight, and
wherein a sum of the first and second amine compound are in a range of from 10 to 100 wt. % of the amine compound, and wherein (i) the acidic gas absorbent does not comprise a metal or comprise solely sodium as metal and/or (ii) the acidic gas absorbent does not comprise a nonionic surfactant.

21. The acidic gas absorbent of claim 20, wherein (i) the acidic gas absorbent does not comprise a metal or comprises solely sodium as metal.

22. The acidic gas absorbent of claim 20, wherein (ii) the acidic gas absorbent does not comprise a nonionic surfactant.

23. The acidic gas absorbent of claim 17, wherein the amine compound is the second amine compound of formula (2).

24. The acidic gas absorbent of claim 18, wherein the amine compound has any of formula (2-1) to (2-6).

25. The acidic gas absorbent of claim 20, wherein the amine compound is the second amine compound of formula (2).

\* \* \* \* \*